United States Patent
Groeger et al.

(10) Patent No.: US 9,740,968 B2
(45) Date of Patent: Aug. 22, 2017

(54) METHOD AND DEVICE FOR AUTOMATIC INSERTION OF PROOF SHEETS IN RUNNING PRINTING APPLICATIONS IN DIGITAL PRINTING SYSTEMS

(71) Applicant: Oce Printing Systems GmbH & Co. KG, Poing (DE)

(72) Inventors: Hans-Detlef Groeger, Poing (DE); Joerg Schmidt, Munich (DE)

(73) Assignee: Océ Printing Systems GmbH & Co. KG, Poing (DE)

( * ) Notice: Subject to any disclaimer, the term of this patent is extended or adjusted under 35 U.S.C. 154(b) by 0 days.

(21) Appl. No.: 14/824,485

(22) Filed: Aug. 12, 2015

(65) Prior Publication Data
US 2016/0048743 A1 Feb. 18, 2016

(30) Foreign Application Priority Data
Aug. 12, 2014 (DE) .................. 10 2014 111 463

(51) Int. Cl.
  *G06K 15/02* (2006.01)
  *G06F 3/12* (2006.01)

(52) U.S. Cl.
  CPC ......... *G06K 15/026* (2013.01); *G06F 3/1215* (2013.01); *G06F 3/1256* (2013.01); *G06F 3/1267* (2013.01); *G06F 3/1268* (2013.01); *G06F 3/1282* (2013.01); *G06K 15/1856* (2013.01); *G06K 15/1817* (2013.01)

(58) Field of Classification Search
None
See application file for complete search history.

(56) References Cited

U.S. PATENT DOCUMENTS

| 5,535,009 | A | 7/1996 | Hansen | |
|---|---|---|---|---|
| 2006/0262335 | A1* | 11/2006 | Varga | G06F 3/1208 358/1.13 |
| 2008/0262656 | A1* | 10/2008 | Gauronski | G03G 15/5012 700/275 |
| 2010/0020356 | A1* | 1/2010 | Kawasaki | G06F 3/1204 358/1.15 |

(Continued)

FOREIGN PATENT DOCUMENTS

JP 2002268474 A * 9/2002

*Primary Examiner* — Fan Zhang
(74) *Attorney, Agent, or Firm* — Schiff Hardin LLP (57) ABSTRACT

In a method or controller to execute a proof job of a copy print job, the proof job including a printing of a proof sheet, at a first point in time first raster data for the print sheet of the copy print job is provided. After expiration of a first provisioning time period at least one first job is inserted for printing a plurality of copies of the print sheet into a print buffer. A second point in time is determined at which the print buffer includes a first number of copies of the print sheet that are to be printed, the first number being such that a time period for printing of the first number of copies is greater than or equal to a second provisioning time period for providing of second raster data for the proof sheet of the proof job. After expiration of the second provisioning time period a second job is inserted to print the proof sheet into the print buffer so that copies of the print sheet and the proof sheet are printed according to an order of the first and the second jobs in the print buffer.

19 Claims, 6 Drawing Sheets

(56) References Cited

U.S. PATENT DOCUMENTS

2011/0317202 A1* 12/2011 Negishi ............. G03G 15/5012
  358/1.14
2014/0333967 A1* 11/2014 Ohkawa ............. H04N 1/00278
  358/1.16

* cited by examiner

METHOD AND DEVICE FOR AUTOMATIC INSERTION OF PROOF SHEETS IN RUNNING PRINTING APPLICATIONS IN DIGITAL PRINTING SYSTEMS

BACKGROUND

The disclosure concerns a digital printer for printing to a recording medium. In particular, the disclosure concerns a method and a device to reduce or avoid spoilage in a digital printer.

In packaging printing, an identical sheet is printed with a high run count, meaning that a relatively high number of copies of a sheet are printed. Such a print job may be designated as a copy print job. The number of copies of a copy print job may be in the range of multiple tens of thousands of sheets, and thus occupies a digital printer for a relatively long time period. It is desirable that, while the digital printer prints a one copy print job, a following print job may be prepared and it may be ensured via test printouts (also designated as proofs) that color, content etc. of a sheet to be printed correspond to the requirements of the following print job.

U.S. Pat. No. 5,535,009 describes a combined printer/copier with a FIFO/LIFO storage for interrupt print jobs.

SUMMARY

It is an object to provide a method and a corresponding device via which enables the printing of one or more proof sheets within the scope of a copy print job. It should thereby be ensured that substantially no interruption of the digital printer which would lead to an increase of the printing time and to a generation of spoilage is caused by the insertion of the printing of a proof.

In a method or controller to execute a proof job of a copy print job, the proof job including a printing of a proof sheet, at a first point in time first raster data for the print sheet of the copy print job is provided. After expiration of a first provisioning time period at least one first job is inserted for printing a plurality of copies of the print sheet into a print buffer. A second point in time is determined at which the print buffer includes a first number of copies of the print sheet that are to be printed, the first number being such that a time period for printing of the first number of copies is greater than or equal to a second provisioning time period for providing of second raster data for the proof sheet of the proof job. After expiration of the second provisioning time period a second job is inserted to print the proof sheet into the print buffer so that copies of the print sheet and the proof sheet are printed according to an order of the first and the second jobs in the print buffer.

DESCRIPTION OF EXEMPLARY EMBODIMENTS

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

According to one aspect, a method is described for processing a proof job within the scope of a copy print job. The proof job includes the printing of at least one proof sheet, and the copy print job includes the printing of a plurality of copies of a print sheet. The method includes: the provisioning of first raster data for the print sheet of the copy print job at a first point in time; and, after expiration of a provisioning time period of the first raster data, the insertion of at least one job for printing a plurality of copies of the print sheet in a print buffer. Moreover, the method includes the provisioning of second raster data for the proof sheet of the proof job at a second point in time. At the second point in time, the print buffer thereby includes a first number of copies of the print sheet that are to be printed, wherein the first number is such that a time period for printing the first number of copies of the print sheet is greater than or equal to a provisioning time period for the provisioning of the second raster data. Moreover, after expiration of the provisioning time period of the second raster data the method includes the insertion of a job for printing of the proof sheet in the print buffer.

According to a further aspect, a print administration controller is described wherein the digital printing is set up to print a plurality of copies of a print sheet of a copy print job. The print administration controller is set up to provide first raster data for the print sheet of the copy print job for the digital printer at a first point in time and—after expiration of a provisioning time period for the first raster data—to insert at least one job for printing a plurality of copies of the print sheet into a print buffer of the digital printer. The print administration controller is additionally set up to provide second raster data for a proof sheet of a proof job at a second point in time. At the second point in time, the print buffer includes a first number of copies of the print sheet that are to be printed, wherein the first number is such that a time period that the digital printer requires to print the first number of copies of the print sheet is greater than or equal to a provisioning time period for the second raster data. Moreover, the print administration controller is set up to insert a job for printing of the proof sheet into the print buffer of the digital printer after expiration of the provisioning time period for the second raster data.

According to a further aspect, a print administration controller is described that is set up to print a plurality of copies of a print sheet of a copy print job. The print administration controller comprises: a first interface (or first transmission resources) to provide first raster data for the print sheet of the copy print job, and for transmission of at least one job to print a plurality of copies of the print sheet to a print buffer of the first administration controller. Furthermore, the print administration controller comprises a second interface (or second transmission resources) with a digital printer controller to provide second raster data for a proof sheet of a proof job. The second interface or the second transmission resources is/are thereby reserved exclusively for the provisioning of raster data of a proof job. It may thereby be ensured that the raster data of a proof job may be provided without negatively affecting a copy print job.

According to a further aspect, a digital printer controller is provided that is set up to print a plurality of copies of a print sheet of a copy print job. The digital printer controller comprises a first interface (or first transmission resources) with a print administration controller to receive first raster data for the print sheet of the copy print job, and to receive at least one job to print a plurality of copies of the print sheet. Furthermore, the digital printer controller comprises a print buffer for buffering the plurality of copies of the print sheet that are to be printed. Furthermore, the digital printer controller may comprise a second interface (or second transmission resources) with the print administration controller to receive second raster data for a proof sheet of a print job. The second interface or the second transmission resources may thereby be exclusively reserved for the receipt of raster data of a print job. Alternatively or additionally, the digital printer controller may comprise one or more raster image processors that are set up to raster second raster data transmitted by the print administration controller in order to provide a raster graphic for the proof sheet. The one or more raster image processors may thereby be reserved for the rastering of raster data of a print job. Via the provision of a dedicated second interface and/or of one or more dedicated raster image processors, it may be ensured that the raster data of a print job may be provided without negatively affecting a copy print job. Furthermore, the insertion of proof sheets into running copy print jobs may take place flexibly with regard to timing via the provision of dedicated transmission/raster resources.

According to a further aspect, a software (SW) program is described. The SW program may be set up in order to be executed on a processor (for example on a computer/server) and in order to thereby execute a method described in this document.

According to a further aspect, a storage medium is described. The storage medium may include a SW program which is set up in order to be executed on a processor, and in order to thereby execute a method described in this document.

In the following, exemplary embodiments are described in detail using schematic drawings.

Figure 1:
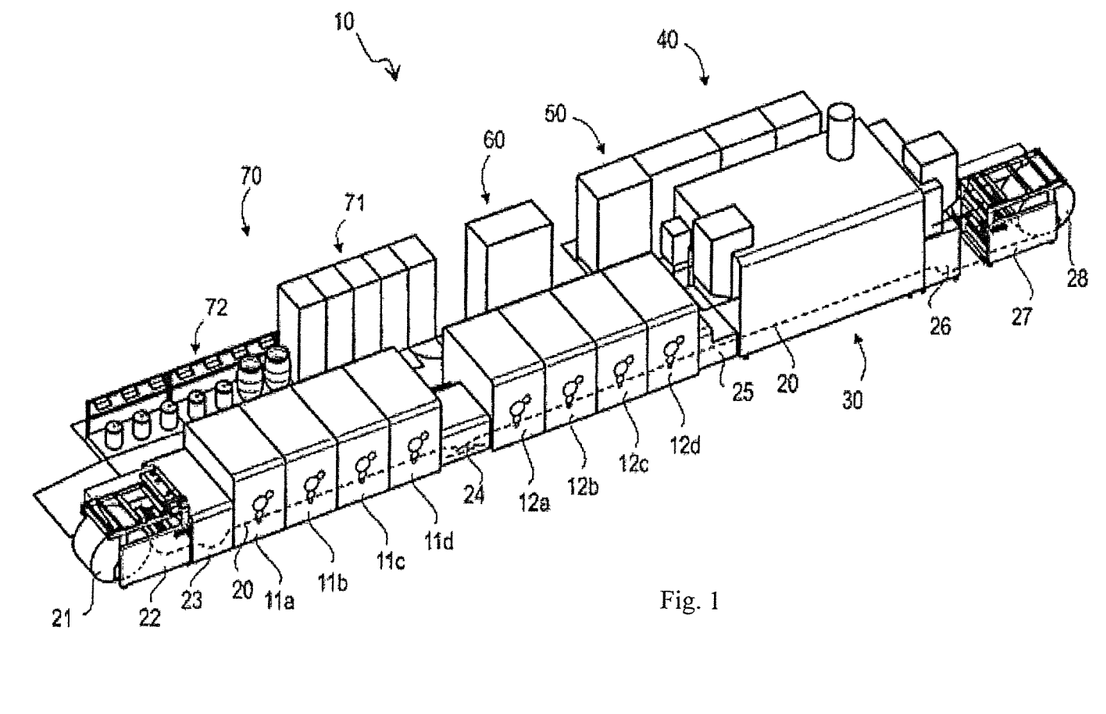
FIG. 1 is a view of a digital printer in an exemplary configuration of the digital printer.

According to FIG. 1, a digital printer 10 for printing to a recording medium 20 has one or more print groups 11*a*-11*d* and 12*a*-12*d* that print a toner image (print image 20'; see FIG. 2) onto said recording medium 20. As shown, a web-shaped recording medium 20 is unwound from a roll 21 with the aid of an unwinder 22 and is supplied to the first print group 11*a*. The print image 20' is fixed on the recording medium 20 in a fixing unit 30. The recording medium 20 may subsequently be rolled up on a roll 28 with the aid of a take-up unit 27. Such a configuration is also designated as a roll-to-roll printer. Alternatively, the recording medium 20 may be divided up into individual sheets by a cutter or sheet cutter (not shown) at the output of the fixing unit 30.

FIG. 1 depicts a digital printer 10 based on the electrophotographic principle. It is noted that the exemplary embodiments described in this document are also applicable to other types of digital printers 10, in particular to digital printers 10 in which a print image 20' is generated using print groups 11*a*-11*d* and 12*a*-12*d* with inkjet nozzles.

In the configuration depicted in FIG. 1, the web-shaped recording medium 20 is printed in full color with four print groups 11*a* through 11*d* on the front side and with four print groups 12*a* through 12*d* on the back side (what is known as a 4/4 configuration). For this, the recording medium 20 is unwound from roller 21 by the unwinder 22 and is supplied to the first print group 11*a* via an optional conditioning group 23. In the conditioning group 23, the recording medium 20 may be pre-treated or coated with a suitable substance. Wax or chemically equivalent substances may preferably be used as a coating substance (also designated as a primer).

The coating substance may be applied to the full surface, or only to the points of the recording medium 20 that are later to be printed, in order to prepare the recording medium 20 for printing and/or in order to affect the absorption response of the recording medium 20 upon application of the print image 20'. It is therefore prevented that the toner particles or the carrier fluid that are applied later do not penetrate too significantly into the recording medium 20, but rather essentially remain on the surface (whereby the color quality and image quality are improved).

First, the recording medium 20 is subsequently supplied in series to the first print groups 11*a* through 11*d* in which only the front side is printed to. Each print group 11*a*-11*d* typically prints to the recording medium 20 in a different color, or also with a different toner material (for example MICR toner, which may be read electromagnetically).

After printing to the front side, the recording medium 20 may be turned in a turning unit 24 and be supplied to additional print groups 12*a*-12*d* for printing to the back side. An additional conditioning group (not shown in FIG. 1) via which the recording medium 20 is prepared for printing to the back side may be arranged in the region of the turning unit 24. It is thus prevented that the front side print image is mechanically damaged by the subsequent print groups upon additional transport.

In order to achieve a full-color printing, at least four colors (and therefore at least four print groups 11, 12) are required, and in fact the primary colors YMCK (yellow, magenta, cyan and black), for example. Additional print groups 11, 12 with special colors (for example customer-specific colors or additional primary colors in order to expand the printable color space) may also be used.

After the print group 12*d*, a register 25 is arranged via which registration markings that are printed to the recording medium 20 independently of the print image 20' (in particular outside of the print image 20') are evaluated. The transverse and longitudinal registration (the primary color points that form a color printing should be arranged atop one another or spatially very close to one another; this is also designated as color registration or four-color registration) and the register (front side and back side must spatially coincide with one another) can therefore be adjusted so that a qualitatively good print image 20' is achieved.

After the register 25, the fixer 30 is arranged via which the print image 20' is fixed on the recording medium 20. Given electrophoretic digital printers, a thermal dryer—that largely evaporates the carrier fluid so that only the toner particles remain on the recording medium 20—is preferably used as a fixer 30. This occurs under the effect of heat. The toner particles may thereby also be fused to the recording medium 20 insofar as they include a material (resin, for example) that can melt as a result of the heating effect.

After the fixer 30, a drawing group 26 is arranged that draws the recording medium 20 through all print groups 11*a*-12*d* and the fixer 30, without an additional drive being arranged in this region. The danger that the as of yet unfixed print image 20' might be smeared might exist due to a friction drive for the recording medium 20.

The drawing group 26 supplies the recording medium 20 to the take-up 27, which rolls up the recording medium 20 to be printed. Alternatively, the recording medium 20 may be cut into individually printed sheets by a sheet cutter.

All supply devices for the digital printer 10—such as air conditioning 40, power supply 50, controller 60, fluid management 70 such as fluid control 71 and reservoir 72 of the various fluids—are arranged centrally in the print groups 11, 12 and the fixer 30. In particular, pure carrier fluid, highly concentrated liquid developer (high proportion of toner particles relative to the carrier fluid) and serum (liquid developer plus charge control substances) are required as fluids in order to supply the digital printer 10, as well as waste containers for fluids to be disposed of or containers for cleaning fluid.

The digital printer 10 with its structurally identical print groups 11, 12 is of modular design. The print groups 11, 12 do not differ mechanically but rather only in the liquid developer (toner color or toner type) used therein.

As shown in FIG. 1, the digital printer 10 may be operated as a roll-to-roll printer. It is also possible to cut the recording medium 20 into sheets at the end, and to subsequently stack the sheets or process them further in a suitable manner (roll-to-sheet printer). It is likewise possible to supply a sheet-shaped recording medium 20 to the digital printer 10, and to stack the sheets at the end or process them further (sheet-to-sheet printer).

If only the front side of the recording medium 20 is printed, at least one print group 11 with a color is required (simplex printing). The at least one print group 11 may also be designated as a simplex print group. If the back side is also printed, at least one print group 12 for the back side is also required (duplex printing). The at least one print group 12 may also be designated as a duplex print group. Depending on the desired print image 20' on the front side and back side, the printer configuration includes a corresponding number of print groups for front side and back side, wherein each print group 11, 12 is always designed for only one color or one type of toner.

The maximum number of print groups 11, 12 is only technically dependent on the maximum mechanical tension load of the recording medium 20 and the free gauge length. Arbitrary configurations from a 1/0 configuration (only one print group for the front side to be printed) up to a 6/6 configuration (in which six respective print groups may be present for front side and back side of the recording medium 20) are typically possible. In packaging printing, a 7/0 configuration is often used in which 7 print groups for the front side and no print group for the back side are present. A possible embodiment (configuration) is depicted in FIG. 1 (a 4/4 configuration), with which full-color printing for front-side and back-side is accomplished with the four primary colors. The order of the print groups 11, 12 given four-color printing preferably passes from a print group 11, 12 that prints a light color (yellow) to a print group 11, 12 that prints a dark color; for example, the recording medium 20 is thus printed from light to dark in the color order Y-C-M-K.

The recording medium 20 may be made of paper, pasteboard, cardboard, metal, plastic and/or other suitable and printable materials.

Figure 2:
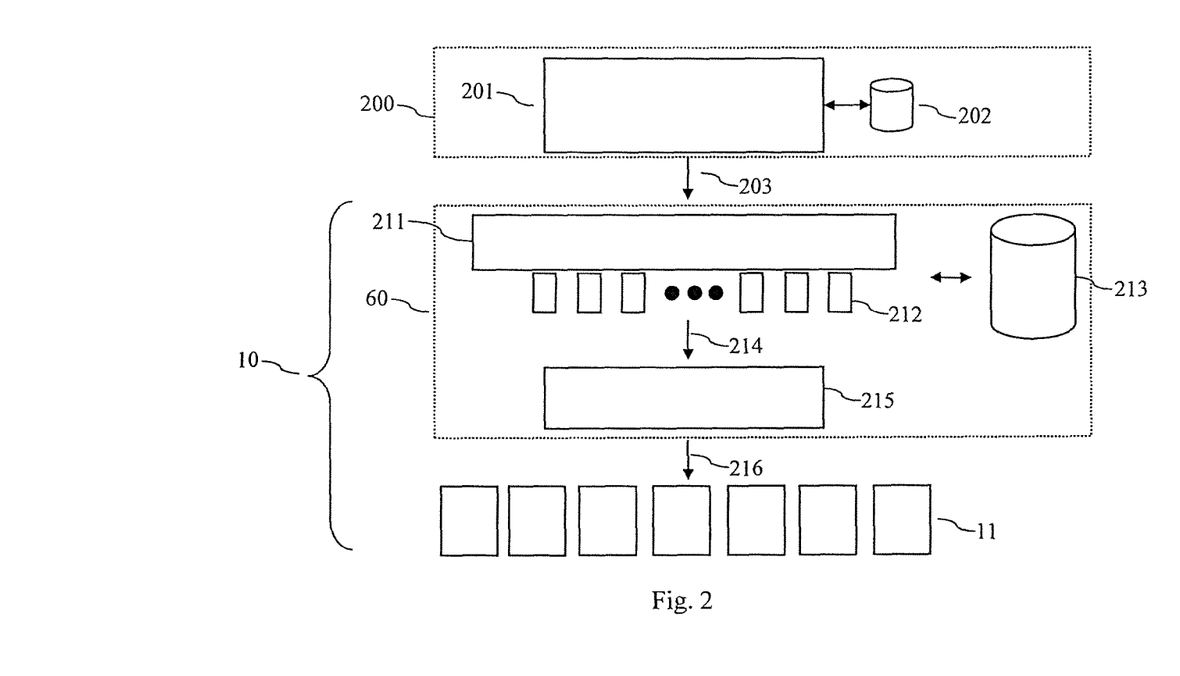
FIG. 2 shows exemplary components of a printing system.

FIG. 2 shows example components of a printing system which comprises a print administration controller 200 and the digital printer 10. The print administration controller 200 comprises a printer driver 201 that is set up to transfer a print job to the digital printer controller 60. The print job may in particular include the print data 203 to be printed. Furthermore, print resources for the print job may be transmitted to the digital printer controller 60. The print resources and/or print data 203 may be stored in a memory 202 of the print administration controller 200. The print resources and/or print data 203 may be transferred to the digital printer controller 60 via an interface, for example an IPDS (Intelligent Printer Data Stream) interface.

The print data 203 for a sheet to be printed are typically transmitted to the digital printer controller 60 in unrastered form. The print data 203 are then rastered by the controller 60 (with a defined color depth per color/per print group 11). For this, one or more raster image processors 212 are typically used. The print data 203 received via the interface from a print processor 211 of the controller 60 are typically data of a high-level page description language (for example PDF or PostScript). These print data 203 are converted by a raster image processor 212 into a raster graphic 214. The raster graphic 214 describes the individual image points or pixels of a sheet to be printed with a defined resolution or color depth (8-bit, for example) per color. The raster graphic 214 of a sheet may then be stored in a raster memory 213.

The creation of a raster graphic 214 for a sheet to be printed is typically very computationally intensive. The controller 60 may therefore comprise a plurality of raster image processors 212 in order to create a sufficiently high number of raster graphics 214 so that the digital printer may print continuously.

Before the transfer to the print groups 11 of the digital printer 10, a raster graphic 214 is converted into a print raster 216 in a screener 215. The semi-tones of the individual image points of a raster graphic 214 are thereby rastered according to the color depth. The screening process is thereby dependent on the properties of the print groups 11 (in particular on whether a toner printing or an ink printing takes place).

The digital printer 10 may be designed for printing of a high number of identical sheets and/or pages. An example use case is packaging printing, in which the same sheet (for creation of a packaging) is printed with a high run count (for example 10,000 pieces). In this case, the controller 60 may be equipped with a relatively low number of raster image processors 212 since the sheet to be printed must only be rastered once, and the raster graphic 214 of the sheet to be printed may then be reused for every sheet to be printed. Alternatively or additionally, the raster graphic 214 of the sheet to be printed may be passed directly from the print administration controller 200 to the digital printer controller 60. The number of raster image processors 212—and therefore the costs of the controller 60—may thus be further reduced.

Given digital printers 10 in a roll-to-roll or roll-to-sheet configuration, the necessary print sheet rastering capability (and therefore the number of raster image processors 212) depends on the web throughput velocity of the recording medium 20. In terms of its dimensions in the direction of print travel, the raster graphic 214 of a print sheet should be generated or provided at least just as quickly as the raster graphic 214 is output again onto the recording medium 20 upon transport (i.e. upon transfer-printing) onto the recording medium, in order to prevent interruptions of the digital printer 10. For this purpose, one or more raster graphics 214 may be held ready in a raster memory 213 in order to compensate for fluctuations in the duration of the rastering of the individual sheets, caused by differing degrees of complexity of the print sheets.

In the case of the absence of a raster graphic 214 in a raster memory 213 at the point in time of the transfer printing (i.e. at the point in time of the transfer to the recording medium 20), a forced stop takes place that leads to the generation of a specific number of spoilage sheets, depending on the digital printer 10. These sheets are rejects and—depending on the type of recording medium 20 that is used—are of different material value, which negatively affects the costs per produced print sheet.

The goal is therefore to minimize the reject costs as much as possible, and to avoid spoilage. The costs for recording medium 20 are especially markedly higher in the field of graphic arts (GA) and in packaging printing (VD)—due to the necessary paper quality—than in the field of the transactions and direct mail market (TDM). The print administration controller 200 may be set up to arrange print jobs in a suitable order and to transfer them to the digital printer 10 in order to avoid or minimize a stoppage of the digital printer 10. In particular, print jobs with the same media requirements may be produced in succession and/or short print jobs may be "collected". Furthermore, the production may only be started when an efficient execution is possible in a print run of the digital printer 10.

Figure 3A:
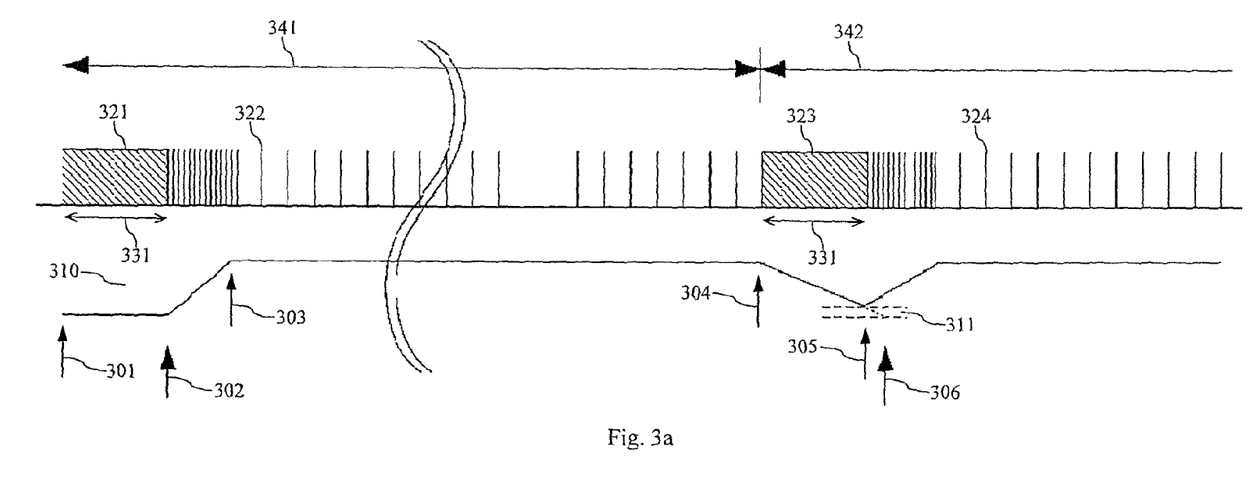
FIGS. 3a through 3c illustrate exemplary workflows in the processing of print jobs in a printing system.

FIG. 3a illustrates the execution of two example print jobs 341, 342, in particular of two copy print jobs 341, 342. At the point in time 301, the raster data 321 of the first print job 341 are transferred from the print retention unit 200 to the controller 60. FIG. 3a shows the provisioning time period 331 (between point in time 301 and point in time 302) that is required in order to transfer the raster graphic 214 as raster data 321 from the print administration controller 200 into the raster memory 213 and/or in order to transfer and raster unrastered print data 203 of the first print job 341 in order to generate the raster graphic 214 of the sheet to be printed within the scope of the first print job 341.

At the point in time 302, the raster memory 213 thus includes the raster graphic 214 of the sheet to be printed. The print administration controller 200 may activate the printing of a first copy of the sheet to be printed by transmitting a sheet command 322 (also designated as a job in this document). Furthermore, additional sheet commands 322 may be transmitted to the controller 60 in order to fill a print buffer 310 of the digital printer 10. The print buffer 310 may be filled via receipt of additional sheet commands 322 up to the point in time 303. Additional sheet commands 322 may subsequently be transmitted such that the print buffer 310 continues to remain full or that a predefined fill level of the print buffer 310 is maintained.

After expiration of the provisioning time period 331 (i.e. at the point in time 302), the production of the print sheets may be started by the digital printer 10. Each of the sheets to be printed is created in reaction to a sheet command 322 from the print buffer 310. The number of sheet commands 322 typically corresponds to the number of copies that should be produced within the scope of the first print job 341.

At the point in time 304, the print administration controller 200 may initiate the second print job 342. For this purpose, the raster data 323 are provided for the second print job 342. For this, a raster graphic 214 may be transferred directly to the controller 60, or print data 203 may be transferred and rastered in order to provide the raster graphic 214 for the second print job 342. The provisioning time period 331 that is required for this is bridged in that the sheet commands 322 of the first print job 341 are executed from the print buffer 310 by the digital printer 10. Since the print administration controller 200 has already transferred all required sheet commands 322 of the first print job 341 to the digital printer controller 60 at the point in time 304, and since sheet commands 324 for the second print job 342 may not yet be transferred, the buffer level decreases as of the point in time 304. However, the number of sheet commands 322 in the print buffer 310 is sufficiently high so that the digital printer 10 may continually produce additional sheets of the first print job 341 up to the point in time 305 (i.e. up to the provisioning of the raster graphic 214 in the raster memory 213), and thus no interruption of the print operation takes place.

As of the point in time 305, the print buffer 310 is filled again with sheet commands 324 of the second print job 342. The print buffer 310 possibly includes a safety reserve 311 so that the production of the first print job 341 is only concluded at a later point in time 306, and thus the printing of the second print job 342 may only be begun at the point in time 306.

As presented in FIG. 3a, a continuous print job to create a plurality of identical copies may be provided via suitable planning of print jobs 341, 342. Individual proof sheets are required for the preparation of such copy print jobs 342. The proof sheets of a print job 342 may then be analyzed in order to modify settings (for color settings) of the print job 342 as necessary. The printing of a proof sheet is a dedicated print job that may be designated as a proof job. If such proof jobs are individually inserted into a sequence of print jobs, before and/or after a proof job this typically leads to a start/stop operation of the digital printer 10, whereby the spoilage proportion of the entire print production is increased.

To avoid an interruption of the print operation upon insertion of a proof job, it is proposed to insert a proof job into a running print job 341 such that, upon insertion of the proof job, the print buffer 310 is sufficiently filled in order to bridge the provisioning time period 331 for providing the raster graphic 214 of the proof job into the raster memory 213 without interrupting the print operation. Furthermore, the proof job may be inserted into the running print job 341 such that, after execution of the proof job, sufficient sheet commands 322 for the running print job 341 are still outstanding in order to sufficiently fill the print buffer 310 again in preparation for a following print job 342, such that the provisioning time period 331 to provide the raster graphic 214 of the following print job 342 may be bridged without interruption of the print operation.

Figure 3B:
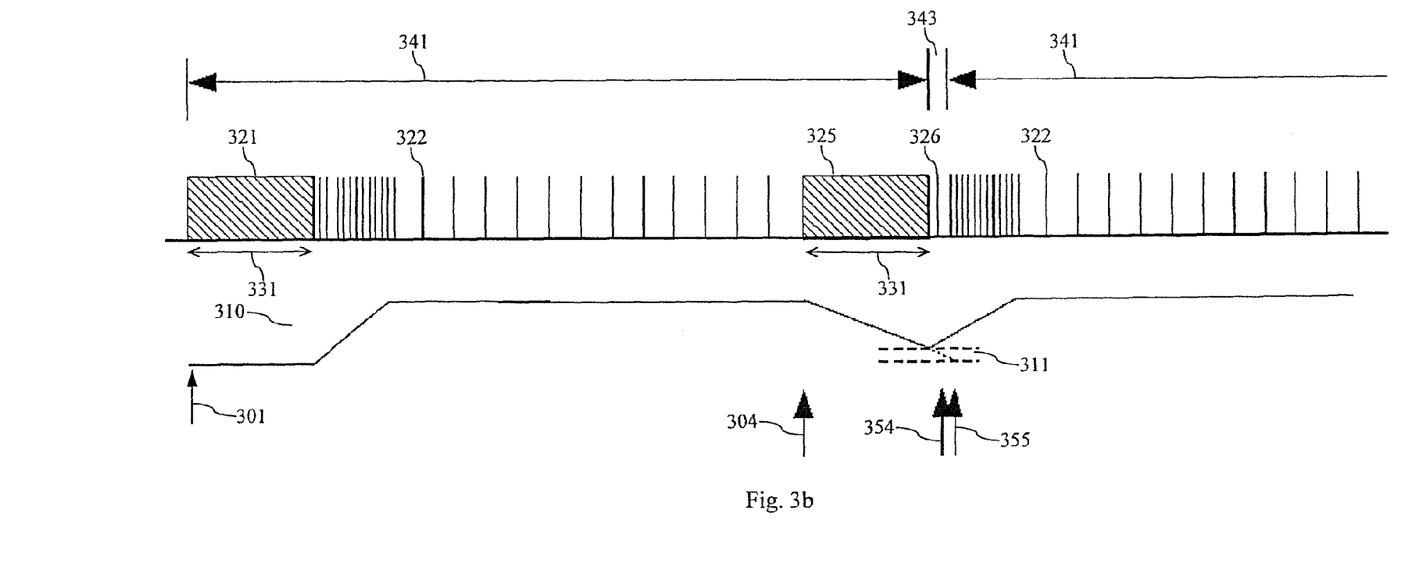
Figure 3C:
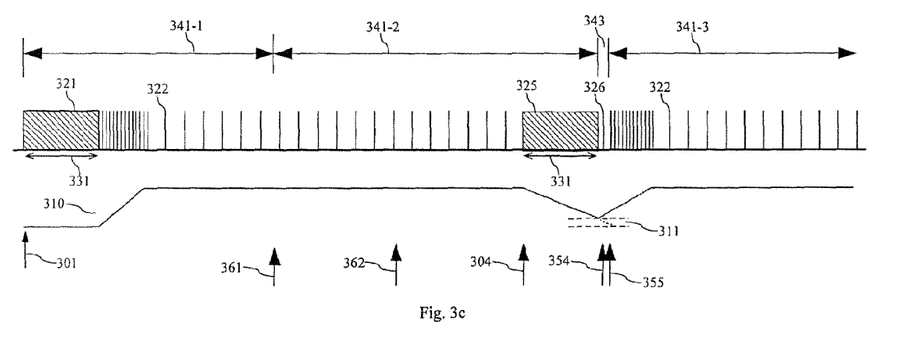

FIGS. 3b and 3c show as an example how a proof job 343 may be inserted into a running print job 341 without interrupting the print operation. In FIG. 3b, the proof job 343 is initiated by the print administration controller 200 at a point in time 304. The point in time 304 is selected such that the print buffer 310 is filled sufficiently at this point in time 304 in order to bridge the preparation time period 331 to process the data 325 of the proof job 343 without interruption of the print operation. As of this point in time 304, no additional sheet commands 322 are transmitted for the running print job 341, such that the fill level of the print buffer 310 decreases. After the provisioning time period 331, the sheet command 326 of the proof job 343 is then transmitted (point in time 354). The proof sheet is then printed at the point in time 355 (i.e. after execution of the safety reserve 311 of the print buffer 310).

Furthermore, after transmission of the sheet command 326 of the proof job 343, the transmission of sheet commands 322 for the running print job 341 is resumed so that the fill level of the print buffer 310 increases again.

In other words, the print administration controller 200 (for example a spool system of the print administration controller 200) may identify and label a job 343 as a proof job (for example on the basis of the fact that only one or a small number of copies are to be printed). The print administration controller 200—for example a printer back end (PBE) of the print administration controller 200—checks whether, at the current point in time, the number of already transferred sheets of the running job 341 at the print controller 60, minus the sheets that were already checked out by the digital printer controller 60, is greater than or equal to the required number of sheets of the print buffer 310 that are to be printed. If this condition is present, the current job 341 may be interrupted and the new print job 343 may be directly transferred to the digital printer controller 60. If the condition is not currently satisfied, the comparison may be implemented again at every additional sheet (i.e. at every sheet command 322) that is transferred to the printer 10.

If the condition with regard to the interruption-free insertion of the proof job 343 into the current print job 341 can no longer be satisfied, the proof jog 343 remains in the standby position and the query with regard to the possibility of insertion of the proof job 343 is transferred to the next regular print job 342.

If the condition is satisfied, the interruption of the running print job 341 may take place in such a manner that the one or more newly constructed (i.e. rastered) print sheets of the proof job 343 are inserted directly into the raster memory 213, whereby no interruption of the print process is incurred. The interruption of the running print job 341 takes place such that the data required for the running print job 341 (in particular the one or more raster graphics 214) continue to be kept ready in the digital printer controller 60 in order to be able to resume the running print job 341 again after the interruption, without provisioning time period 331.

If no regular print job 341 is pending, the proof job 342 typically may only be transferred, rastered and written by the digital printer controller 60 into the raster memory 213 if the digital printer 10 is in the stop state (no travel of the recording medium 20), in order to produce no delays for regular print jobs 341. Due to the marking of the job 343 as a proof job and the transfer of this information to the controller 60, it may be ensured that the print is not started by the controller 60. The raster graphics 214 of the transferred one or more proof sheets then remain in the raster memory 213 until a regular print job 341 is transferred, and thus the one or more proof sheets may be printed without spoilage.

A proof sheet may be marked as spoilage by the controller 60. The digital printer 10 may include a spoilage gate that is set up to separate sheets labeled as spoilage from the other printed sheets. The marking of a proof sheet as spoilage thus enables an efficient discharge of the proof sheet, and thus an efficient separation from the print sheets of a running print job 341.

After execution of the proof job 343, the regular 341 is continued further. The proof job with all resources (in particular the raster graphics 214) may be deleted at the controller 60. In the spool system, the print job is marked as printed and all set features for the presence of a print job are reset. In the event that additional proof jobs are present in the spool system, a new notification of the next proof job may take place directly after the reset.

The system counter of the print system may be treated as in a regular print operation. The proof job 343 may be counted as spoilage within the regular print job 341, such that the number of sheets of the regular print job 341 is not affected.

FIG. 3c describes an additional example of the insertion of a proof job 343 in a running print job 341. In the shown example, the running print job 341 is subdivided into a plurality of sub-jobs 341-1, 341-2, 341-3. The length of the sub-jobs 341-1, 341-2, 341-3 (i.e. the number of sheet commands 322 per sub-job) may be selected such that, at the end of a sub-job 341-1, 341-2, 341-3, the print buffer is filled sufficiently in order to bridge the provisioning time period 331 for a proof job 343 without interruption.

In the depicted example, the transfer of sheet commands 322 of a first sub-job 341-1 of the print job 341 ends at the point in time 361. At the point in time 361, a check may be made as to whether a proof job 343 is present. In the depicted example this is not the case since the proof job 343 only arrives as of the point in time 362. At the point in time 304, which lies after the point in time 362 and after the end of the transfer of sheet commands 322 of the second sub-job 341-2, the print administration controller 200 determines that the proof job 343 is present. This proof job 343 is then inserted at the point in time 304 (i.e. at the end of the second sub-job 341-2).

In other words, a print job 341 may be stored within a print job queue in the print administration controller 200 before the print job 341 is started. A proof job queue may additionally be provided that may be managed by an operator.

A print job 341 may be subdivided into a plurality of sub-jobs 341-1, 341-2, 341-3, for example into a start job 341-1, n (n is greater than or equal to 0) middle jobs 341-2 and an end job 341-3. Each of these sub-jobs 341-1, 341-2, 341-3 may have a length N such that (2+n)×N results in the total length of the print job 341 (the length of the end job 341-3 may thereby be rounded up). The length N of a sub-job 341-1, 341-2, 341-3 is thereby greater than the number of print sheets necessary to buffer the provisioning time period 331.

The print administration controller 200 may be designed such that only the original print job 341 and the respective status are displayed via a GUI (graphical user interface). The division into sub-jobs 341-1, 341-2, 341-3 may be designed to be invisible from the outside. The division into sub-jobs 341-1, 341-2, 341-3 is advantageous since no new commands (in particular IPDS commands) are required for the communication between print administration controller 200 and digital printer controller 60. Furthermore, no modifications need to be made due to the division into sub-jobs 341-1, 341-2, 341-3 in the controller 60. The workflow for the execution of a job takes place identically for all jobs, and no changes are made to the print job itself. Given the division into sub-jobs 341-1, 341-2, 341-3, only the processing of a copy print job 341 in the print administration controller 200 needs to be adapted.

In the case of a printing without proof sheet, the raster graphic 214 (for example a bitmap) of the print job 341 may be prepared within the scope of the start job 341-1 and be stored as a resource in the controller 60 (for example in the raster memory 213). The content of the start job 341-1 is printed N times and then typically ended via IPDS. The start job 341-1 typically does not differ from a typical print job, with the exception that the stored resource (in particular the raster graphic 214) is not deleted after the end of the start job 341-1.

For a middle job 341-2, the raster data 321 (for example the bitmap) are not re-transferred and re-prepared. Instead of this, the stored raster graphic 214 is retrieved from the raster memory 213 and the sheet is respectively printed again N times. No provisioning time periods 331 are created, and the print buffer 310 in the controller 60 remains filled.

An end job 341-3 is executed like a middle job 341-2. However, the end job 341-3 includes an additional command (in particular an IPDS command) via which the stored raster graphic 214 of the print job 341 is deleted at the end of the end job 341-3.

The printing of a proof sheet takes place such that, after the end of a start or middle job, the print administration controller 200 checks whether a proof job for printing is present in a special proof job queue. This proof job 343 is then transferred like a normal print job and printed with a copy. Via additional markings or "Type 1" commands, this copy may be imposed in the post-processing. The information regarding imposition may be inserted by the print administration controller 200.

The provisioning time period 331 of the proof job 343 is intercepted by the print buffer 310 in the controller 60. The following middle or end job requires no provisioning time period 331, meaning that the print buffer 310 is continuously filled again after insertion of the proof job 343.

As was already presented above, the print administration controller 200 may be set up to conceal the sub-division of a print job 341 into sub-jobs 341-1, 341-2, 341-3 from the outside. In particular, the print job 341 may externally be depicted with its full count of copies to be created. The accounting data from the sub-jobs 341-1, 341-2, 341-3 may be added up and associated with the actual print job 341. An error recovery may operate with the sub-jobs 341-1, 341-2, 341-3 without changing the response established via IPDS.

Alternatively or additionally, the controller 60 may include one or more raster image processors 212 that may be used to process the data 325 of a proof job 343 at an arbitrary point in time, and to create a raster graphic 214 for the proof job 343. The raster graphic 214 of a proof job 343 may be prepared at an arbitrary point in time without the execution of a copy print job 341 thereby being negatively affected.

If the raster data 325 (in particular the print data 203) of the proof job 343 are received by the controller 60, these raster data 325 may be passed to the one or more raster image processors 212 specially kept ready for proof jobs 343, and there are directly prepared in parallel with a running print job 341. The entry of a raster graphic 214 that is thereby generated into the raster memory 213 may take place with a corresponding labeling of the sheet as spoilage. The entry of the newly constructed raster graphic 214 of the proof job 343 takes place directly into the raster memory 213 at any arbitrary point in time which does not cause an interruption of the printing of the copy print job 341 at the digital printer 100. The printing of the proof job 343 may then be inserted between two copy print jobs 341, 342 at an arbitrary point in time.

Alternatively or additionally, a dedicated transfer interface (in particular a dedicated transfer bandwidth or a dedicated transfer resource) may be kept ready between the print administration controller 200 and the digital printer controller 60 for the transmission of raster data 325 (for example for the transmission of the raster graphic 214) of a proof job 343. Via the provision of such a transfer interface for proof jobs 343 it may be ensured that the raster graphic 214 of a proof job 343 may be provided without negatively affecting a copy print job 341.

Figure 4:
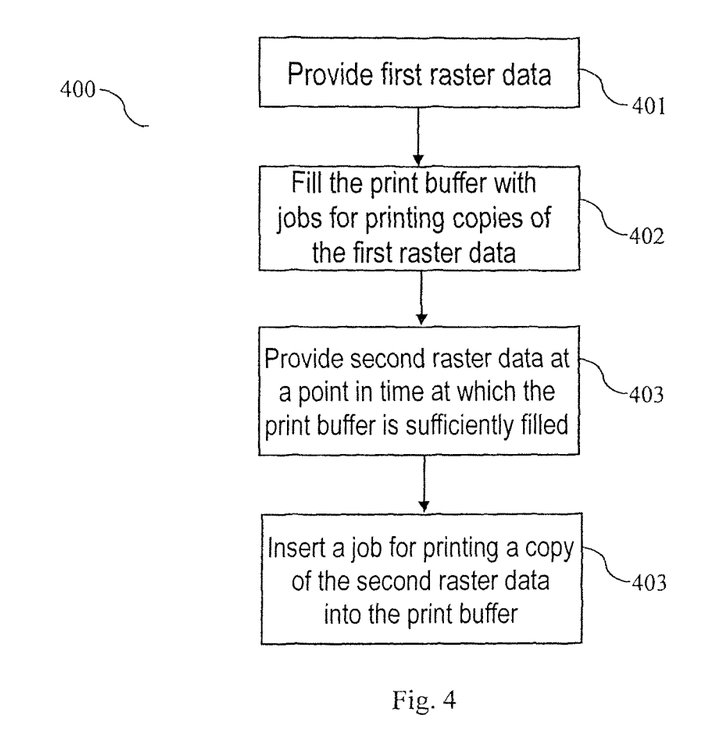
FIG. 4 illustrate a workflow diagram of an exemplary method to print test pages.

FIG. 4 shows a workflow diagram of a method 400 to process or implement a proof job 343 within the scope of a copy print job 341. The proof job 343 thereby includes the printing of a proof sheet (possibly of multiple proof sheets). The copy print job includes the printing of a plurality of copies (for example of 1000 or more copies) of a print sheet.

The method 400 includes the provision 401 of first raster data 321 for the print sheet of the copy print job 341 at a first point in time 301. For this purpose, unrastered data may be transferred from the print administration controller 200 to the digital printer controller 60, and are translated by one or more raster image processors 212 of the controller 60 into a raster graphic 214. Alternatively, the raster graphic 214 may be transmitted directly from the print administration controller 200 to the digital printer controller 60.

After the expiration of a provisioning time period 331 for the provisioning 401 of the first raster data 321, the method 400 additionally includes the insertion 402 of at least one job 322 (in particular the insertion of sheet commands) to print a plurality of copies of the print sheet into the print buffer 310 of the digital printer 10. Via the insertion 402, the print buffer 310 is at least partially filled in order to prepare the execution of the proof job 343.

At a second point in time 304, the method 400 additionally includes the provision 403 of second raster data 325 for the proof sheet of the proof job 343. For this, print data 203 may be rastered at the controller 60 in order to create the raster graphic 214 of the proof sheet. Alternatively, the raster graphic 214 may be transferred directly from the print administration controller 200 to the digital printer controller 60. For this, in both cases a provisioning time period 331 for the second raster data is required by the rastering and/or by the transmission, via which provisioning time period 331 an interruption of the printing of the digital printer 10 might be caused.

The second point in time 304 lies after the first point in time 301 and after the provisioning time period 331 for the provisioning 401 of the first raster data 321. The second point in time may in particular be selected such that the print buffer 310 includes a first number of copies of the print sheet at the second point in time 304, wherein the first number is such that a time period that the digital printer 20 requires to print the first number of copies of the print sheet is greater than or equal to the provisioning time period 331 for the provisioning 403 of the second raster data 325. It may thus be ensured that the printing is not interrupted by the insertion of the proof job 343.

Moreover, after expiration of the provisioning time period 331 for the second raster data 325 the method 400 includes the insertion 404 of a job 326 to print the proof sheet into the print buffer 310. The copies of the print sheet and the proof sheet may then be printed by the digital printer 10 to a recording medium 20 in the order of the jobs (sheet commands) 322, 326 in the print buffer 310. The proof sheet may thus be inserted between the copies of a copy print job 341 without interruption. It may thereby be induced that the proof sheet is printed with a marking that enables a spoilage gate of the digital printer 10 to automatically identify the printed proof sheet. The proof sheet may thus be efficiently filtered out of a plurality of printed copies of the copy print job 341.

Following the insertion 404 of the job 326 for printing of the proof sheet, the method 400 may additionally include the insertion of one or more jobs 322 to print an additional plurality of copies of the print sheet in the print buffer 310. In other words, the proof sheet may be inserted between individual copies of the copy print job 341. It may thereby be ensured that, at the second point in time 304, the copy print job 341 includes a second number of copies of the print sheet for which no jobs 322 have not yet been inserted into the print buffer 310. The second number of copies of the print sheet may be greater than or equal to a provisioning time period 331 for the provisioning of raster data 323 of an additional copy print job 342. It may thus be ensured that no interruption following the production of the copy print job 342 takes place due to the insertion of the proof job.

The copy print job 341 may be divided up into a plurality of sub-jobs 341-1, 341-2, 341-3. Each of the plurality of sub-jobs 341-1, 341-2, 341-3 may thereby include the printing of a subset of the total number of copies of the print sheet. The subset of a first sub-job (or, respectively, all sub-jobs) of the plurality of sub-jobs 341-1, 341-2, 341-3 may be such that the print buffer 310 is filled by the first sub-job such that the provisioning time period 331 for the second raster data 325 is bridged by the printing of copies of the first sub-job. The second point in time 304 (at which the provisioning of the second raster data 325 is initiated) may thus lie between the processing of two of the plurality of sub-jobs 341-1, 341-2, 341-3. The division of the copy print jobs 341 into sub-jobs is advantageous since a proof job 343 may thus be inserted simply and precisely. Moreover, the expenditure for the adaptation of existing printing systems (in particular the adaptation of a controller 60 of a digital printer 10) may thus be reduced.

After the insertion of jobs 322 for the copies of the first sub-job into the print buffer 310, it may be checked (for example by the print administration controller 200) whether the proof job 343 is present for processing. If the proof job 343 is present for processing, the second raster data 325 for the proof sheet of the proof job 343 may thus be provided.

The plurality of sub-jobs 341-1, 341-2, 341-3 may include a start-job 341-1 within the scope of which the first raster data 321 are provided for the print sheet. Furthermore, the plurality of sub-jobs 341-1, 341-2, 341-3 may include an end job, following which the provided first raster data 321 are deleted from a raster memory 213 of the digital printer 10.

The method 400 described above may in particular be executed by the print administration controller 200 for the digital printer 10. For example, the print administration controller 200 may be implemented as software on a computer/server. In particular, the print administration controller 200 may be set up to provide the first raster data 321 for the print sheet of the copy print job 341 for the digital printer 10 at the first point in time 301. Furthermore, the print administration controller 200 may be set up to insert at least one job 322 for printing a plurality of copies of the print sheet into a print buffer 310 of the digital printer 10 after the expiration of a provisioning time period 331 for the first raster data 321. Moreover, the print administration controller 200 may be set up to provide second raster data 325 for a print sheet of a proof job 343 at a second point in time 304. At the second point in time 304, the print buffer 310 thereby has a first number of copies of the print sheet, wherein the first number is such that a time period that the digital printer 10 requires to print the first number of copies of the print sheet is greater than or equal to a provisioning time period 331 for the second raster data 325. Furthermore, the print administration controller 200 may be set up to insert a job 326 for printing the proof sheet into the print buffer 310 of the digital printer 10 after expiration of the provisioning time period 331 for the second raster data 325.

The method and device described in this document are generally applicable to a printing environment in which the data preparation (in particular the print administration controller 200 and/or the digital printer controller 60) has been optimized for copy printing, and thus the raster service and/or the data transfer service is not kept ready in order to prepare and/or provide arbitrary sheet series for the printing system for printing without interruption. Via the method and device described in this document, a printing of copy print jobs and proof jobs may thus be enabled in a cost-effective manner without interruption.

The method and devices described in this document are advantageous since a method-dependent stoppage upon interruption of a copy print job and/or in the printing of a proof job may be avoided. The production of spoilage that is caused by such a stop may thus be efficiently avoided. The print production may be implemented without interruption, with the simultaneous generation of proofs.

Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

We claim as our invention:

1. A method to execute a proof job during a copy print job with an interruption-free insertion of the proof job into the copy print job, the proof job including a printing of a proof sheet and the copy print job including printing of a plurality of copies of a print sheet, the method comprising:

at a first point in time, providing first raster data for the print sheet of the copy print job;

after expiration of a first provisioning time period for provisioning of the first raster data, inserting at least one first job for printing a plurality of copies of the print sheet into a print buffer;

determining a buffer value of the print buffer, the buffer value corresponding to a number of buffered copies of the of the print sheet of the copy print job within the print buffer;

determining a number of copies of the print sheet of the copy print job that can be printed within a second provisioning time period for provisioning of second raster data for the proof sheet of the proof job;

determining whether the buffer value at a second point in time is greater than or equal to the determined number of copies of the print sheet;

in response to the buffer value being greater than or equal to the determined number of copies of the print sheet at the second point in time:
providing the second raster data for the proof sheet of the proof job at the second point in time; and
after expiration of the second provisioning time period for the provisioning of second raster data, inserting a second job to print the proof sheet into the print buffer to print copies of the print sheet and the proof sheet according to an order of the first and the second jobs in the print buffer; and in response to the buffer value being less than the determined number of copies of the print sheet at the second point in time:
repeatedly determining, for subsequent copies of the plurality of copies of the print sheet being printed into the print buffer, an updated buffer value of the print buffer and whether the updated buffer value is greater than or equal to the determined number of copies of the print sheet; and
providing the second raster data for the proof sheet of the proof job and inserting the second job to print the proof sheet into the print buffer after expiration of the second provisioning time period in response to the updated buffer value being greater than or equal to the determined number of copies of the print sheet.

2. The method according to claim 1, further comprising:
following the insertion of the second job to print the proof sheet, inserting the at least one first job to print an additional plurality of copies of the print sheet into the print buffer.

3. The method according to claim 1 wherein:
the second point in time is determined such that, at the second point in time the copy print job includes a second number of copies of the print sheet for which first job has been inserted into the print buffer; and
the second number of copies of the print sheet is greater than or equal to a provisioning time period for the provisioning of raster data of an additional copy print job.

4. The method according to claim 1, further comprising:
dividing up the copy print jobs into a plurality of sub-jobs; wherein each of the plurality of sub-jobs includes the printing of a subset of a total number of copies of the print sheet; and wherein the subset of a first sub-job of the plurality of sub-jobs is such that the print buffer is filled by the first sub-job such that the second provisioning time period for the provisioning of the second raster data is bridged by printing of copies of the first sub-job.

5. The method according to claim 4, further comprising:
after insertion of the at least one first job for the copies of the first sub-job into the print buffer, checking whether the proof job is present for execution; and
if the proof job is present for execution, providing the second raster data for the proof sheet of the proof job.

6. The method according to claim 4 wherein the second point in time lies between execution of two of the plurality of sub-jobs.

7. The method according to claim 4 wherein the plurality of sub-jobs includes:
a start job within which the first raster data for the print sheet are provided; and
an end job following which the provided first raster data are deleted.

8. The method according to claim 1, further comprising:
initiating that copies of the print sheet and the proof sheet are printed to a recording medium according to an order in the print buffer.

9. The method according to claim 1, further comprising:
initiating that the proof sheet is printed with a marking that enables a spoilage gate of a digital printer to identify the printed proof sheet automatically.

10. The method according to claim 1, wherein the number of buffered copies of the print sheet is a quantity of the plurality of copies of the print sheet of the at least one print job that have been buffered within the print buffer.

11. The method according to claim 1, wherein determining the buffer value comprises determining the buffer value based on a difference of a number of the plurality of copies of the print sheet of the at least one print job and a number of the plurality of copies of the print sheet having been printed.

12. The method according to claim 1, further comprising:
determining whether the buffer value or the updated buffer value will be greater than or equal to the determined number of copies of the print sheet during the print copy job; and
entering the proof job into a standby position based on the determination.

13. The method according to claim 12, wherein entering the proof job into the standby position is in response to the determination that the buffer value and the updated buffer value will not be greater than or equal to the determined number of copies of the print sheet during the print copy job.

14. The method according to claim 12, further comprising:
performing an interruption-free insertion of the proof job for a next copy print job based on the determination.

15. The method according to claim 14, wherein entering the proof job into the standby position and performing the interruption-free insertion of the proof job for the next copy print job are in response to the determination that the buffer value and the updated buffer value will not be greater than or equal to the determined number of copies of the print sheet during the print copy job.

16. A print administration controller for a digital printer that is configured to print a plurality of copies of a print sheet of a copy print job with an interruption-free insertion of a proof job into the copy print job, the proof job including a printing of a proof sheet, the print administration controller:
after expiration of a first provisioning time period for provisioning of the first raster data, inserting at least one first job for printing a plurality of copies of the print sheet into a print buffer;
determining a buffer value of the print buffer, the buffer value corresponding to a number of buffered copies of the of the print sheet of the copy print job within the print buffer;
determining a number of copies of the print sheet of the copy print job that can be printed within a second provisioning time period for provisioning of second raster data for the proof sheet of the proof job;
determining whether the buffer value at the second point in time is greater than or equal to the determined number of copies of the print sheet;
in response to the buffer value being greater than or equal to the determined number of copies of the print sheet at the second point in time:
providing the second raster data for the proof sheet of the proof job at the second point in time; and
after expiration of the second provisioning time period for the provisioning of second raster data, inserting a second job to print the proof sheet into the print buffer to print copies of the print sheet and the proof sheet according to an order of the first and the second jobs in the print buffer; and
in response to the buffer value being less than the determined number of copies of the print sheet at the second point in time:
repeatedly determining, for subsequent copies of the plurality of copies of the print sheet being printed into the print buffer, an updated buffer value of the print buffer and whether the updated buffer value is greater than or equal to the determined number of copies of the print sheet; and
providing the second raster data for the proof sheet of the proof job and inserting the second job to print the proof sheet into the print buffer after expiration of the second provisioning time period in response to the updated buffer value being greater than or equal to the determined number of copies of the print sheet.

17. A print administration controller for a digital printer that is configured to print a plurality of copies of a print sheet of a copy print job with an interruption-free insertion of a proof job into the copy print job, the proof job including a printing of a proof sheet, the print administration controller comprising:
a first interface with a digital printer controller of the digital printer to provide first raster data for the print sheet of the copy print job at a first point in time, and to transmit at least one first job for printing a plurality of copies of the print sheet to a print buffer of the digital printer controller, wherein the print administration controller is configured to:
  determine a buffer value of the print buffer, the buffer value corresponding to a number of buffered copies of the of the print sheet of the copy print job within the print buffer;
  determine a number of copies of the print sheet of the copy print job that can be printed within a second provisioning time period for provisioning of second raster data for the proof sheet of the proof job; and
  determine whether the buffer value at the second point in time is greater than or equal to the determined number of copies of the print sheet; and
a second interface with the digital printer controller of the digital printer to provide the second raster data for the proof sheet of the proof job at the second point in time in response to the buffer value being greater than or equal to the determined number of copies of the print sheet at the second point in time, the second interface being reserved exclusively for provisioning of raster data of the proof job, wherein the print administration controller is further configured to:
in response to the buffer value being less than the determined number of copies of the print sheet at the second point in time:
  repeatedly determine, for subsequent copies of the plurality of copies of the print sheet being printed into the print buffer, an updated buffer value of the print buffer and whether the updated buffer value is greater than or equal to the determined number of copies of the print sheet; and
  provide, using the second interface, the second raster data for the proof sheet of the proof job in response to the updated buffer value being greater than or equal to the determined number of copies of the print sheet.

18. A digital printer controller for a digital printer that is configured to print a plurality of copies of a print sheet of a copy print job with an interruption-free insertion of a proof job into the copy print job, the proof job including a printing of a proof sheet, the digital printer controller comprising:
  a first interface with a print administration controller to receive first raster data for the print sheet of the copy print job at a first point in time, and to receive at least one job for printing a plurality of copies of the print sheet;
  a print buffer for buffering the plurality of copies of the print sheet that are to be printed, wherein the print administration controller is configured to:
    determine a buffer value of the print buffer, the buffer value corresponding to a number of buffered copies of the of the print sheet of the copy print job within the print buffer;
    determine a number of copies of the print sheet of the copy print job that can be printed within a second provisioning time period for provisioning of second raster data for the proof sheet of the proof job; and
  determine whether the buffer value at the second point in time is greater than or equal to the determined number of copies of the print sheet; and
  a second interface with the print administration controller to receive the second raster data for the proof sheet of the proof job at the second point in time in response to the buffer value being greater than or equal to the determined number of copies of the print sheet at the second point in time, the second interface being reserved exclusively for the receipt of the second raster data of the proof job,
wherein the print administration controller is further configured to, in response to the buffer value being less than the determined number of copies of the print sheet at the second point in time, repeatedly determine, for subsequent copies of the plurality of copies of the print sheet being printed into the print buffer, an updated buffer value of the print buffer and whether the updated buffer value is greater than or equal to the determined number of copies of the print sheet, and wherein the second interface is configured to receive the second raster data for the proof sheet of the proof job in response to the updated buffer value being greater than or equal to the determined number of copies of the print sheet.

19. A digital printer controller for a digital printer that is configured to print a plurality of copies of a print sheet of a copy print job with an interruption-free insertion of a proof job into the copy print job, the proof job including a printing of a proof sheet, the digital printer controller comprising:
  a first interface with a print administration controller to receive first raster data for the print sheet of the copy print job at a first point in time, and to receive at least one job for printing a plurality of copies of the print sheet;
  a print buffer for buffering the plurality of copies of the print sheet that are to be printed, wherein the print administration controller is configured to:
    determine a buffer value of the print buffer, the buffer value corresponding to a number of buffered copies of the of the print sheet of the copy print job within the print buffer;
    determine a number of copies of the print sheet of the copy print job that can be printed within a second provisioning time period for provisioning of second raster data for the proof sheet of the proof job; and
  determine whether the buffer value at the second point in time is greater than or equal to the determined number of copies of the print sheet; and
  a raster image processor that is configured to raster the second raster data at the second point in time to provide a raster graphic for the proof sheet in response to the buffer value being greater than or equal to the determined number of copies of the print sheet at the second point in time, the raster image processor being reserved for the rastering of the second raster data of the proof job,
wherein the print administration controller is further configured to, in response to the buffer value being less than the determined number of copies of the print sheet at the second point in time, repeatedly determine, for subsequent copies of the plurality of copies of the print sheet being printed into the print buffer, an updated buffer value of the print buffer and whether the updated buffer value is greater than or equal to the determined number of copies of the print sheet, and
wherein the raster image processor is further configured to raster the second raster data for the proof sheet of the proof job in response to the updated buffer value being greater than or equal to the determined number of copies of the print sheet.

* * * * *